United States Patent
Peng et al.

(10) Patent No.: US 9,047,912 B1
(45) Date of Patent: Jun. 2, 2015

(54) WRITE HEAD MODE OPTICAL MODE CONVERTER USING THREE-DIMENSIONAL WAVEGUIDE AND DUAL-MODE WAVEGUIDE

(71) Applicant: Seagate Technology LLC, Cupertino, CA (US)

(72) Inventors: Chubing Peng, Eden Prairie, MN (US); Yi-Kuei Ryan Wu, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/492,862

(22) Filed: Sep. 22, 2014

(51) Int. Cl.
G11B 11/24 (2006.01)
G11B 11/10 (2006.01)

(52) U.S. Cl.
CPC ............... *G11B 11/24* (2013.01); *G11B 11/10* (2013.01)

(58) Field of Classification Search
None
See application file for complete search history.

(56) References Cited

U.S. PATENT DOCUMENTS

| 6,956,447 | B2 | 10/2005 | Lee et al. |
| 8,189,972 | B2 | 5/2012 | Little |
| 2008/0204916 | A1* | 8/2008 | Matsumoto et al. ............ 360/59 |
| 2014/0140659 | A1 | 5/2014 | Demaray |

OTHER PUBLICATIONS

Narevicius et al., "Adiabatic mode multiplexer for evanescent-coupling-insensitive optical switching", Optics Letters, Vo. 30, No. 24, Dec. 15, 2005, pp. 3362-3364.

* cited by examiner

*Primary Examiner* — Wayne Young
*Assistant Examiner* — Brian Butcher
(74) *Attorney, Agent, or Firm* — Hollingsworth Davis, LLC

(57) ABSTRACT

A write head includes a three-dimensional waveguide extending along a light-propagation direction. The three-dimensional waveguide is configured to receive light from a light source at a fundamental transverse electric (TE) mode. The three-dimensional waveguide includes an input coupler, a curved middle section, and a terminating end. The input coupler is tapered between the light source and the curved middle section. The write head includes a dual-mode waveguide extending along the light propagation direction and has an edge proximate to and separated from the curved section by a gap at a coupling region. The three-dimensional waveguide excites a higher-order TE mode in the dual-mode waveguide via the coupling region.

20 Claims, 9 Drawing Sheets

Section 5-5

Section 6-6

Section 7-7

WRITE HEAD MODE OPTICAL MODE CONVERTER USING THREE-DIMENSIONAL WAVEGUIDE AND DUAL-MODE WAVEGUIDE

SUMMARY

The present disclosure is related to a write head optical mode converter using a three-dimensional waveguide and dual-mode waveguide. In one embodiment, a write head includes a three-dimensional waveguide extending along a light-propagation direction. The three-dimensional waveguide is configured to receive light from a light source at a fundamental transverse electric (TE) mode. The three-dimensional waveguide includes an input coupler, a curved middle section, and a terminating end. The input coupler is tapered between the light source and the curved middle section. The write head includes a dual-mode waveguide extending along the light propagation direction and has an edge proximate to and separated from the curved section by a gap at a coupling region. The three-dimensional waveguide excites a higher-order TE mode in the dual-mode waveguide via the coupling region. A near-field transducer is at a media-facing surface of the write head. The near-field transducer receives the light at the higher-order TE mode from the dual-mode waveguide.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

Figure 1:
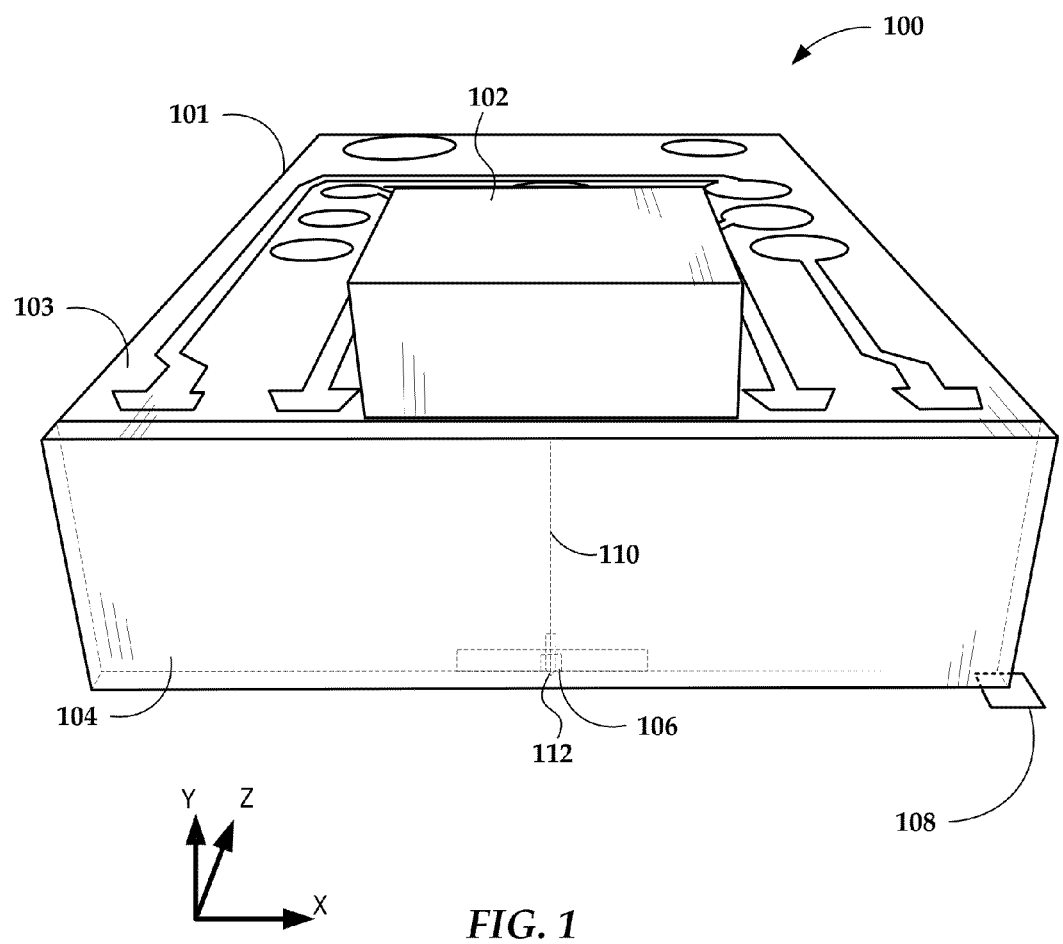
FIG. 1 is a perspective view of a slider assembly according to an example embodiment.

The present disclosure is generally related to an apparatus (e.g., a HAMR read/write head) having a waveguide and mode converter that receives light from a light source (e.g., laser diode). The mode converter converts light from a fundamental, transverse electric (TE) mode to a higher-order TE mode. The light at the higher-order mode is directed to a plasmonic transducer that generates surface plasmons in response. The surface plasmons are directed to heat a recording medium.

A HAMR read/write element, sometimes referred to as a slider or read/write head, includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

A light source such as an edge-emitting laser diode often has $TE_{00}$-like output beam profile. However, a phase-shifted higher-order mode, e.g., $TE_{10}$, is desired for coupling with some configurations of a plasmonic transducer. Embodiments below include a waveguide system that provides mode order conversion, e.g., from $TE_{00}$ to $TE_{10}$. It will be understood that the embodiments below may be configured to excite other higher-order modes, e.g., a $TE(n, m)$ mode, wherein $n>0$ and $m \geq 0$.

Generally, a directional coupler may be used to couple two waveguides to transfer energy from one mode in the first waveguide to another mode in the second waveguide. To relax fabrication tolerance and achieve broadband operation in light wavelength, an adiabatic directional coupler may also be used. Both resonant and adiabatic coupling can be achieved via two separate waveguides placed nearby to one another, e.g., side-to-side.

When two waveguides are placed nearby, the interaction between the two waveguides forms a new set of modes, called normal modes or supermodes. In resonant coupling, if the two waveguides are identical, input light from one waveguide will excite these normal modes. Due to propagation speed being different among these normal modes, the superposition of the normal modes will transfer the light from one waveguide to the other at a beat length. Adiabatic coupler is intended to excite one desired normal mode. The change of this normal mode along the waveguide structure transfers light from input waveguide to the other waveguide. For an adiabatic coupler, the waveguide structure will generally change slowly along propagation direction. For a resonant coupler, the waveguide structure need not vary along the propagation direction, although it may in some cases. Embodiments described below provide mode order conversion in a HAMR light path for excitation of near-field transducers with higher-order modes.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
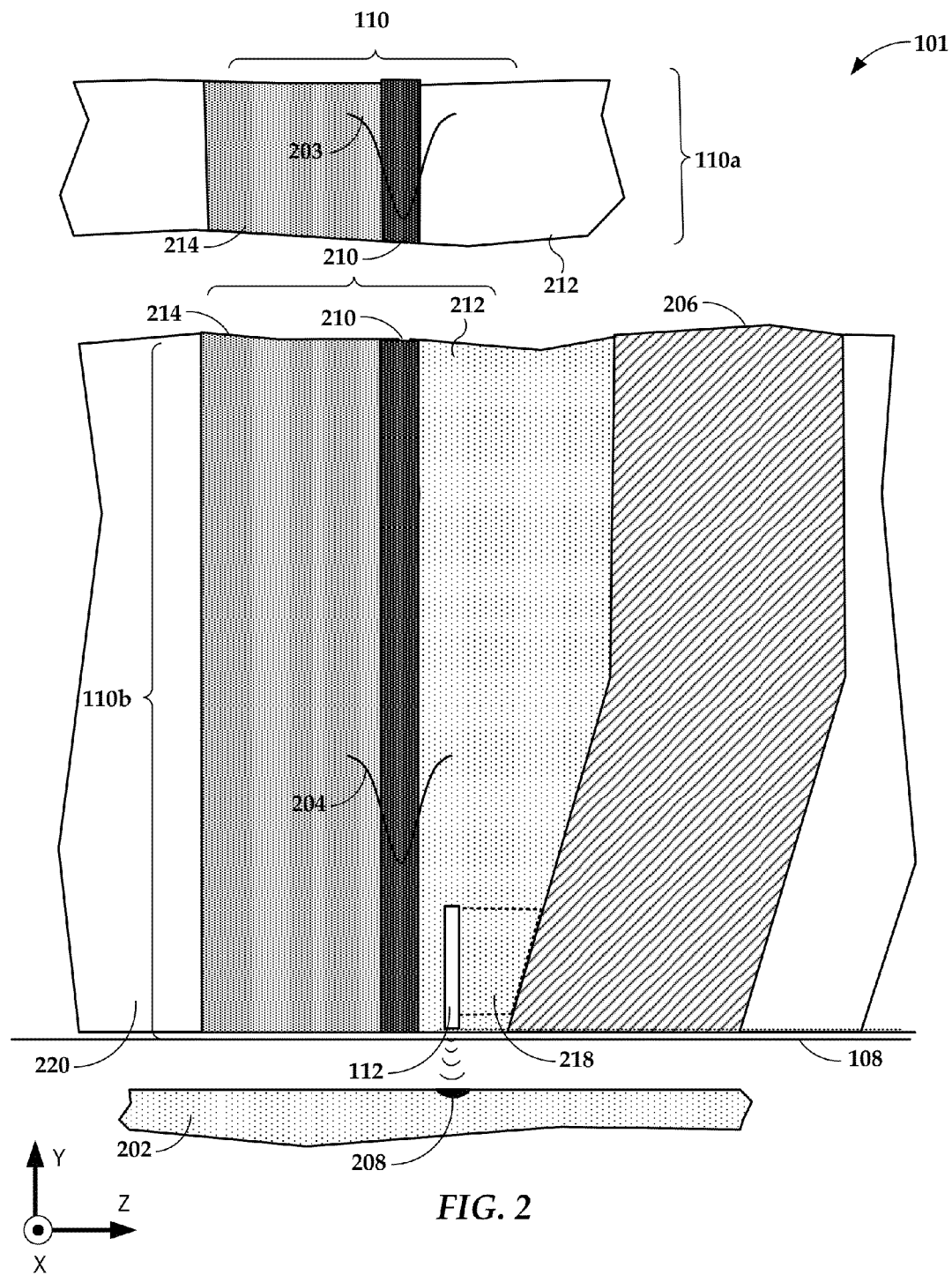
FIG. 2 is a cross-sectional view illustrating a light path with mode converter according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy to the near-field transducer 112, which directs the energy to create a small hotspot 208 on the recording medium 202. A magnetic write pole 206 causes changes in magnetic flux near the media facing surface 108 in response to an applied current. Flux from the write pole 206 changes a magnetic orientation of the hotspot 208 as it moves past the write pole 206 in the down-track direction (z-direction).

The waveguide system 110 includes a first portion 110a configured to receive light 203 from a light source (e.g., laser 102 in FIG. 2) at a fundamental transverse electric (TE) mode (e.g., $TE_{00}$). The first portion 110a may include at least a three-dimensional waveguide extending along the light propagation direction (negative y-direction). The waveguide system 110 also includes a second portion 110b (e.g., a dual-mode waveguide) that outputs light 204 to an output region 215 of the waveguide at a higher-order TE mode (e.g., $TE_{10}$). As will be described in greater detail below, the first and second portions 110a-b includes waveguides that are proximate to and separated from each other. The dimensions and relative orientation of the portions 110a-b are selected to achieve the mode conversion of light propagated to the near-field transducer 112. The near-field transducer 112 receives the light 204 at the higher-order mode and generates surface plasmons that heat the magnetic recording medium 202. The near-field transducer 112 may include or be coupled to a heat sink 218 that extends to the write pole 206.

The waveguide portions 110a-b are formed via a layer of core material 210 surrounding by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, SiNx, $Nb_2O_5$, AlN, $Hf_2O_3$, $Y_2O_3$, etc. Generally, the dielectric materials are selected so that the refractive index of the core layer 210 is higher than refractive indices of the cladding layers 212, 214. This arrangement of materials facilitates efficient propagation of light through the waveguide system 110. While the first and second portions 110a-b are co-planar in this example, they may be offset from each other in the z-direction. For example, the cores may have different thicknesses but be centrally aligned in the z-direction. In such a case, they may be formed from different core and/or cladding layers using the same or different materials.

Figure 3:
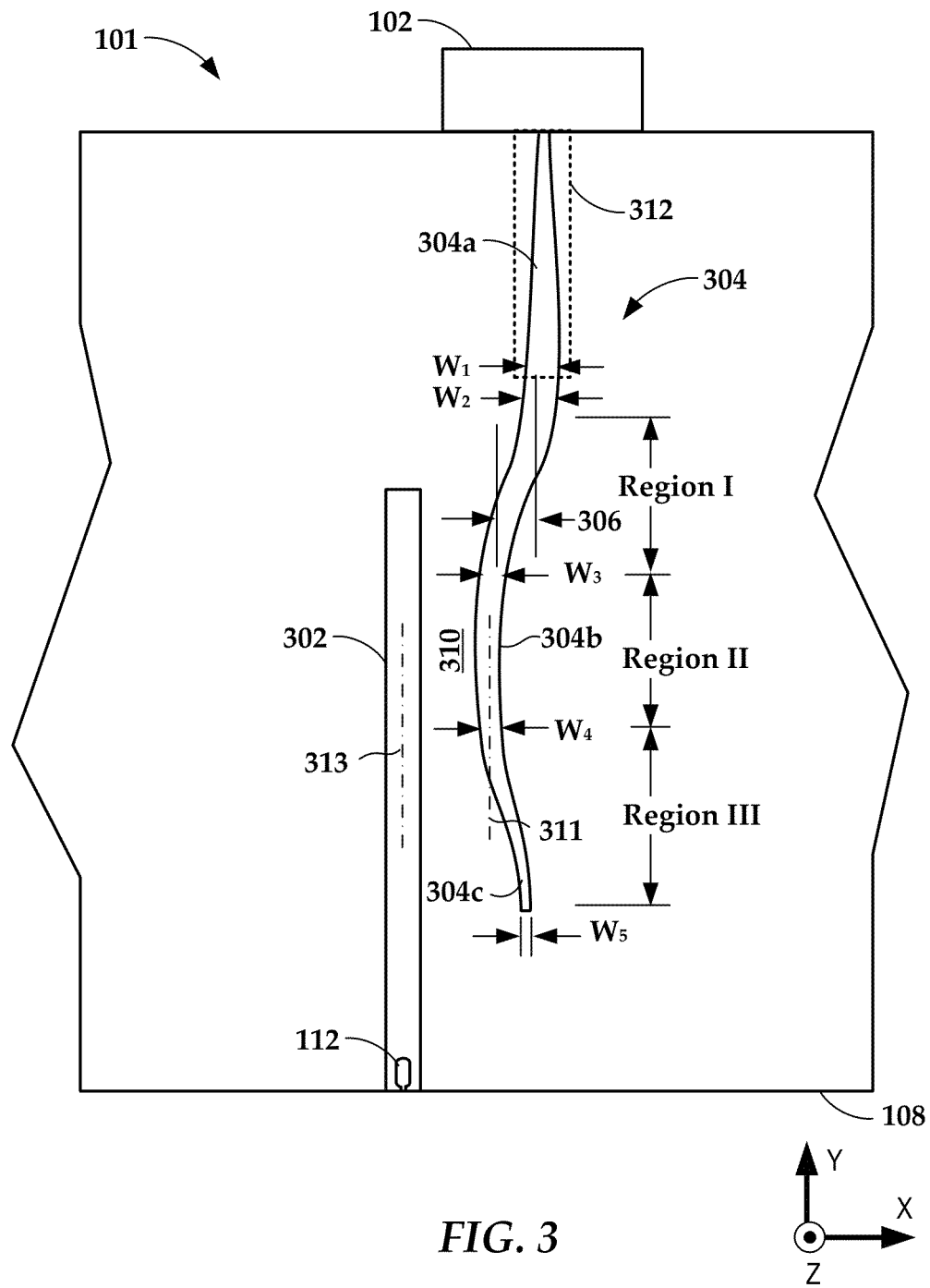
FIG. 3 is a block diagram showing a waveguide system according to an example embodiment.

In FIG. 3, a block diagram shows a waveguide system on a substrate-parallel plane (xy-plane) of a slider body according to an example embodiment. Light emitted from a light source (e.g., laser diode 102) is coupled into a three-dimensional, single mode ($TE_{00}$), channel waveguide 304 by a waveguide input coupler 304a. The three-dimensional waveguide 304 extends along a light-propagation direction (negative y-direction in this view) and includes input coupler 304a, a curved middle section 304b, and a terminating end 304c. An offset 306 is defined between a centerline of the input coupler 304a and midpoint of the middle section 304b.

In this example, a centerline 311 of part of the curved middle section 304b may be parallel to a centerline 313 of the output waveguide in the coupling region (region II), both centerlines 311, 313 being aligned with the light propagation direction (negative y-direction). The curved middle section 304b may include a taper in the coupling region that transitions from a wider dimension towards the input coupler 304a to a narrower dimension towards the terminating end 304c, as indicated by decreasing size of core widths $W_3$ to $W_4$.

A dual-mode waveguide 302 is placed nearby to the three-dimensional waveguide 304, offset in a cross-track direction (negative x-direction in this view). The dual-mode waveguide 302 has an edge proximate to and separated from the curved middle section 304b by a gap 310 at the coupling region, the gap 310 corresponding to the smallest region of separation between the waveguides 302, 304. The launched fundamental mode, $TE_{00}$, in the input coupler 304a, excites the first higher-order mode, e.g., $TE_{10}$, in the dual-mode waveguide 302 via the coupling region.

A near-field transducer 112 is located at the end of the dual-mode waveguide 302 (e.g., on top of or underneath) proximate a media-facing surface 108 of the slider body 101.

In this example, the near-field transducer 112 is configured as an elongated "capsule" shaped body (rectangular plate with rounded smaller ends) with a peg extending towards the media-facing surface 108. Other configurations of a near-field transducer may be used, e.g., circular disc with a peg, elongated peg, etc. The near-field transducer is excited by the higher-order mode propagating in the dual-mode waveguide 302.

The input coupler 304a starts with a narrow cross-track direction width to match the mode profile of the light source along negative y-direction and becomes wider toward the end to transfer light towards the coupling region (e.g., near the curved middle section 304b). In other embodiments, the input coupler 304a may taper in the opposite way, e.g., starting with a wider cross-track direction width near the light source and then becoming narrower towards the coupling region. An assistant layer 312 may be provided on a substrate-parallel plane either above or below the input coupler 304a. In this example, the assistant layer is between a core layer and bottom cladding layer of the three-dimensional waveguide 304.

The assistant layer 312 is optimized to match the waveguide mode profile with the light source 102 along the z-direction (downtrack direction). The assistant layer 312 has an index of refraction slightly higher than that of bottom cladding and much lower than that of the waveguide core. Details of the input coupler and the assistant layer are found in U.S. Pat. No. 8,385,183 entitled "Light Delivery Waveguide" and dated Feb. 26, 2013, which is hereby incorporated by reference. The assistant layer 312 may be truncated at the end of the input coupler 304a and another dielectric cladding may be used. An alternative waveguide input coupler configuration may start from a wider width proximate the light source 102 and become narrower. In such a case, an assistant layer for coupling may not be needed.

The waveguides 302, 304 may be arranged as two parallel waveguides with a fixed structure along the propagation direction that form a resonant directional coupler. To output $TE_{10}$ mode, the dual-mode output waveguide 302 is wider in the cross-track direction than curved portion of the three-dimensional input waveguide 304 and supports two modes: $TE_{00}$ and $TE_{10}$. The width of the dual-mode waveguide 302 is set such that the propagation constant of $TE_{10}$ is nearly equal to that of the $TE_{00}$ mode propagating in the three-dimensional input waveguide 304 at the coupling region.

Figure 8:
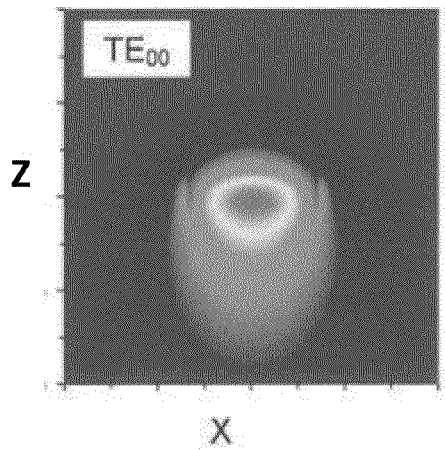
FIGS. 8 and 9 are field intensity plots showing respective $TE_{00}$ and $TE_{10}$ mode profiles before and after mode conversion via an apparatus according to example embodiments.

In the coupled waveguide system, the individual $TE_{10}$ and $TE_{00}$ modes form two normal modes, a symmetric-like mode with propagation constant $\beta_s$ and asymmetric-like normal mode with propagation constant $\beta_a$. The input $TE_{00}$ mode from the input waveguide excites the two normal modes in the coupled system. At beat length $L=\pi/(\beta_s-\beta_a)$, the $TE_{00}$ mode in the input waveguide 304 transfers its optical energy into the $TE_{10}$ mode in waveguide 302. Examples of respective $TE_{00}$ and $TE_{10}$ mode profiles before and after mode conversion are shown in the field intensity plots of FIGS. 8 and 9.

There are a number of issues that may arise for resonant $TE_{00}$-to-$TE_{10}$ mode transfer. For one, at the start of the coupled waveguides, due to the significant difference in spatial mode profile between $TE_{00}$ and $TE_{10}$ mode, the $TE_{00}$ mode in the dual-mode waveguide 302 may also be excited and there may be two modes propagating in the dual-mode output waveguide 302, which may not be desired. To prevent or reduce this, the input coupler 304a and a curved middle section 304b form an S-bend waveguide in region I such that the three-dimensional input waveguide 304 is gradually brought to close to the dual-mode waveguide 302.

A second mode transfer issue that may arise relates to fabrication tolerance and wavelength sensitivity due to normal mode beating in the coupled system. This can be mitigated by having $\beta_1 \neq \beta_2$ (see region II in FIG. 3) to flatten the waveguide coupling. Here $\beta_1$ denotes individual propagation constant of $TE_{00}$ mode in the input waveguide and $\beta_2$ the $TE_{10}$ mode in waveguide 304. At the start of the coupled system, the symmetric-like normal mode is dominantly excited by setting $\beta_1 > \beta_2$ in region I. By tapering the input waveguide from $W_3$ (wider) to $W_4$ (narrower) gradually in region II, normal mode conversion, from symmetric-like to asymmetric-like normal mode, is minimized. Full $TE_{00}$-to-$TE_{10}$ mode transfer can be fulfilled by selecting optimal waveguide parameters, $W_3$ and $W_4$. To have short mode transfer, the waveguide widths could be set such that $\beta_1=\beta_2$ near the middle region II. Note that, the waveguide widths are also chosen to prevent the excitation of a $TE_{00}$ mode in the output waveguide 302.

Another issue that may arise for resonant $TE_{00}$-to-$TE_{10}$ mode transfer is that abrupt truncation in the input waveguide 304 can cause radiation and also possible excitation of $TE_{00}$ mode in the output waveguide 302, particularly if the mode transfer is not 100%. This is mitigated by a transition region III, which bends gradually away from the output waveguide 302 as the width of input waveguide 304 decreases gradually to a tip having width $W_5$.

In one configuration, in the tapered coupling region I, $W_2=W_3$ and $\beta_1>\beta_2$. The symmetric-like normal mode will be dominantly excited and there will be minimum normal mode conversion if the bending is slow. In the tapered velocity region II, $W_3>W_4$, full $TE_{00}$-to-$TE_{10}$ mode transfer is achieved by optimal waveguide widths ($W_3$, $W_4$) for a given gap and coupling length. In another configuration, region I combines both tapered coupling and tapered velocity ($W_2 \neq W_3$). One extreme case is shown in FIG. 4, which shows a waveguide system of a slider body 101a according to another example embodiment.

Figure 4:
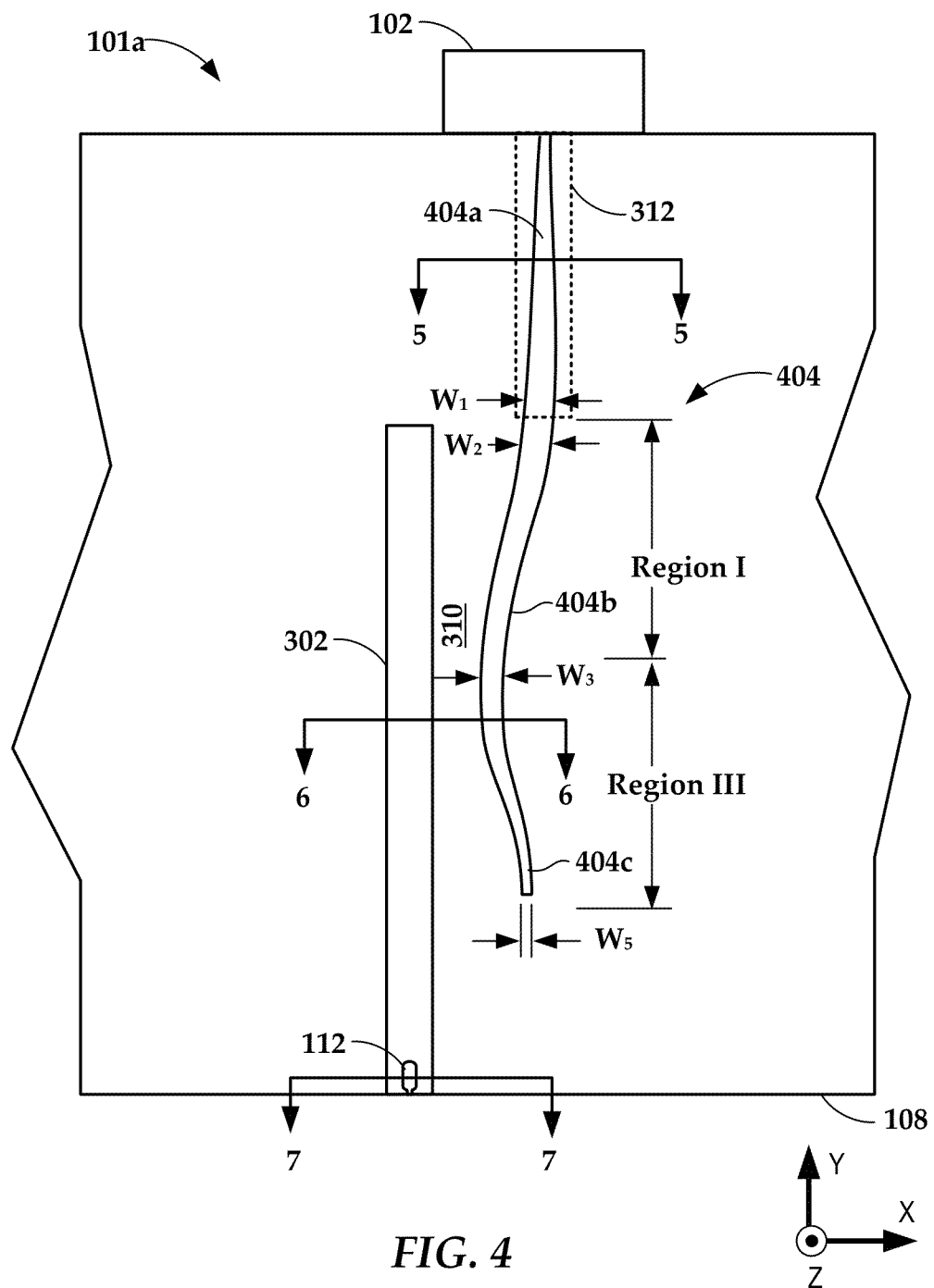
FIG. 4 is a block diagram showing a waveguide system according to another example embodiment.

In FIG. 4, a three-dimensional input waveguide 404 includes an input coupler 404a, a curved middle section 404b, and a terminating end 404c. Other components shown in FIG. 4 have the same or similar function as like-numbered components described above relative to FIG. 3. It will be understood that, while the functions of the like-numbered components (e.g., dual-mode output waveguide 302) in FIGS. 3 and 4 may be similar, the geometry, materials, and other parameters may vary based on geometric differences between the respective waveguides 302, 304, 404. In the example of FIG. 4, region II as shown in FIG. 3 does not exist for waveguide 404. Instead, the $TE_{00}$-to-$TE_{10}$ mode transfer is fulfilled in region I by combining tapered coupling and tapered velocity ($W_2>W_3$). In both FIGS. 3 and 4, if width $W_3$ is very narrow, region III may not be needed. In other configurations, output waveguide 302 may be narrowed, e.g., having a narrower cross-track dimension as the waveguide approaches the media-facing surface 108.

Figure 5:
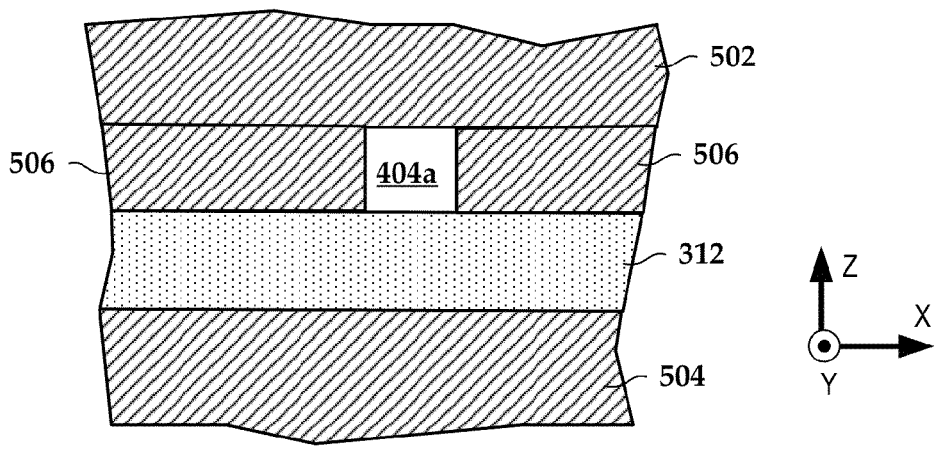
FIGS. 5-7 are cross section views corresponding to section lines 5-5, 6-6, and 7-7 in FIG. 4.
Figure 6:
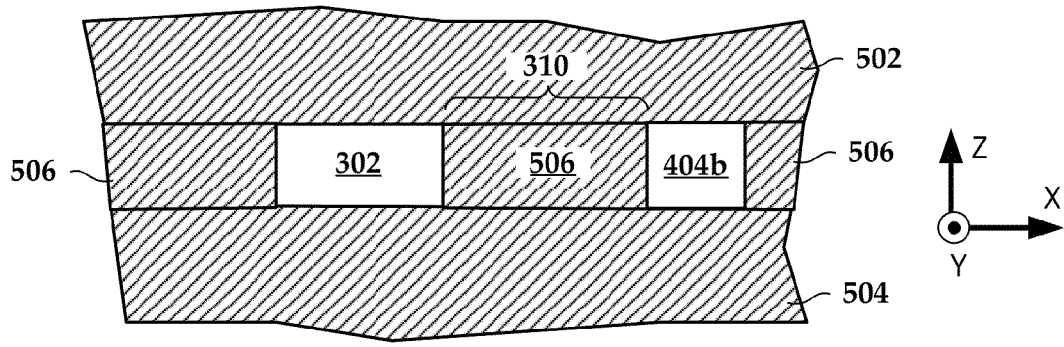
Figure 7:
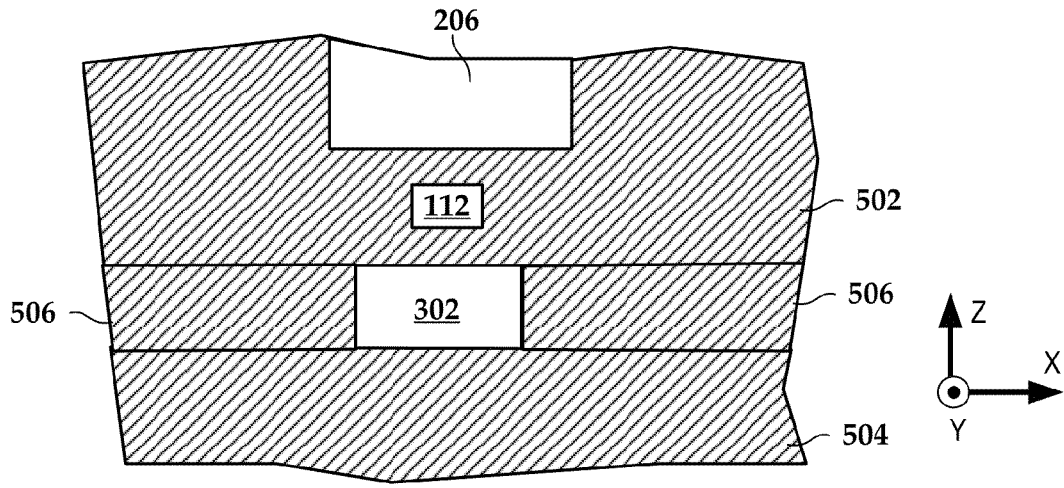

In FIGS. 5-7, cross-sectional views shows details of the slider body 101a corresponding to the respective section lines 5-5, 6-6, and 7-7 shown in FIG. 4. It will be understood that cross-sections shown in FIGS. 5-7 may also correspond to similar regions of the slider body 101 of FIG. 3. In FIG. 5, a part of the input coupler 404a of input waveguide 404 can be seen between top cladding 502 and assistant layer 312. Bottom cladding layer 504 is below the assistant layer 312. Side cladding material 506 surrounds either side of the input coupler 404a, the input coupler 404a forms a core of the input waveguide 404.

In FIG. 6, the curved middle section 404b of waveguide 404 is seen near the output, dual-mode waveguide 302. Side cladding material 506 fills the gap 310 between waveguide 302 and curved middle section 404b, encompassing edges of both of the waveguides 302, 404. The side cladding layer 506 can be made of the same material as the top and/or bottom layers 502, 504, or from a different material than either. In this view, it can be seen that the three-dimensional input waveguide 404 and the dual-mode output waveguide 302 are co-planar. In FIG. 7, the near-field transducer 112 can be seen between the output waveguide 302 and the write pole 206. The near-field transducer 112 and write pole 206 are surrounded by the top cladding layer 502.

Figure 10:
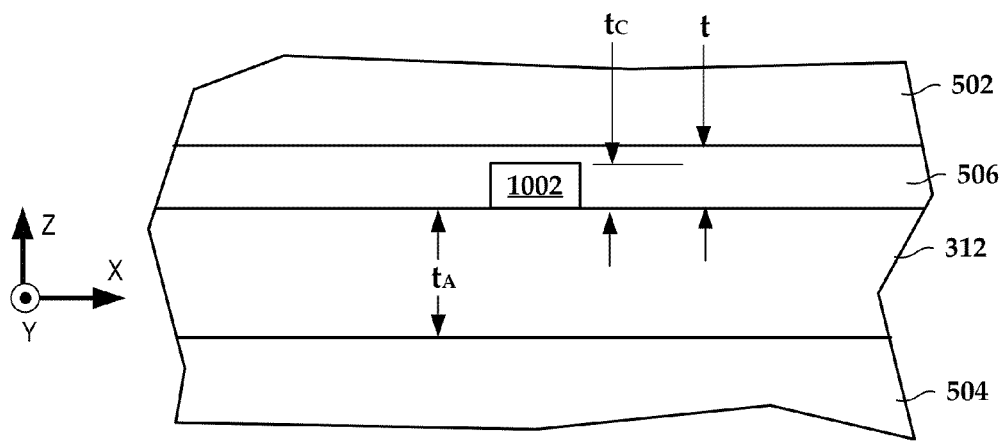
FIGS. 10 and 11 are cross sectional views similar to sections shown in FIGS. 5 and 6 and illustrating alternate waveguide configurations.

In FIG. 10, a block diagram illustrates an alternate configuration of a cross section near the input coupler such as shown in FIG. 5. Similarly, in FIG. 11, a block diagram illustrates the alternate configuration at a cross section near the gap, such as shown in FIG. 6. As seen in FIG. 10, an input waveguide 1002 has a thickness $t_C$ that is less than a thickness t of side cladding layer 506. As such, the side cladding layer 506 encompasses a side of waveguide 1002 between the waveguide 1002 and the top cladding layer 502. An analysis of this configuration was performed assuming that the input waveguide 1002 has a 140-nm $Ta_2O_5$ core with refractive index n=2.084. In the input coupler region seen in FIG. 10, the assistant layer 312 is a 700-nm thick SiONx with index of refraction n=1.70, the bottom cladding layer 504 is $Al_2O_3$, n=1.65. The input coupler of waveguide 1002 (which may correspond to any of 304a, 404a in FIGS. 3 and 4) tapers linearly from 160 nm near the light source 102 to $W_1$=500 nm over 84 μm. The side cladding layer 506 is $Al_2O_3$, t=250 nm, n=1.65. The top cladding layer 502 is $SiO_2$, n=1.46. Wavelength of the light is λ=830 nm.

The assistant layer 312 is truncated after the end of the coupling region (see FIGS. 3 and 4) and it is replaced by a $SiO_2$ layer 1102 (see FIG. 11) to increase index contrast of the waveguide and thereby improve excitation efficiency of the near-field transducer 112. In FIG. 12, a graph shows the mode indexes of modes supported in output waveguide 302 as a function of waveguide width, d2 (see FIG. 11). Mode index is defined as the propagation constant divided by free-space wave-number.

For purpose of optimizing near-field transducer efficiency in this example, width $d_2$=0.9 μm for waveguide 302 is chosen, as indicated by the dashed lines in FIG. 12. At this width, mode index of the $TE_{10}$ mode in waveguide 302 is $n_{eff}(TE_{10})$=1.598. For a conventional resonant directional coupler, the input waveguide width is chosen $W_3$=$W_4$=0.32 μm to match the mode index between the $TE_{00}$ mode in the input waveguide 1002 and the $TE_{10}$ mode in waveguide 302. For the coupled system with separation gap 220 nm, the effective indexes of two normal modes are: $\beta_s$=1.611, $\beta_a$=1.565. Beat length for $TE_{00}$-to-$TE_{10}$ full mode transfer is L=9.14 μm. Based on this, the input waveguide width can be tapered from $W_2$=0.5 μm to $W_3$=$W_4$=0.32 μm (see region I in FIG. 3).

With a configuration as in FIG. 3, the length of region II for full $TE_{00}$-to-$TE_{10}$ mode transfer is determined to be around 3 μm, based on a beam-propagation method. An adiabatic coupler requires a longer coupling length than a conventional resonant coupler, due to the reduction in coupling strength. To design an adiabatic coupler, region II is chosen to be 8 μm long. Other parameters are: region I S-bend offset 306 (see FIG. 3)=1 μm, region III length=15 μm and the tip end width $W_5$=150 nm (facilities easier fabrication). The widths $W_3$ and $W_4$ are optimized to maximize the $TE_{00}$-to-$TE_{10}$ mode transfer. It is found that, in this example, setting $W_3$=370 nm, $W_4$=220 nm results in a transfer efficiency of 96.5%. No $TE_{00}$ mode is seen in the output waveguide 302. The dimension in region II is 320 nm at the middle between $W_3$ and $W_4$. With this setting, effective mode index of $TE_{10}$ mode in output 302 is nearly equal to that of the input waveguide 304, which shortens the coupling region.

Figure 11:
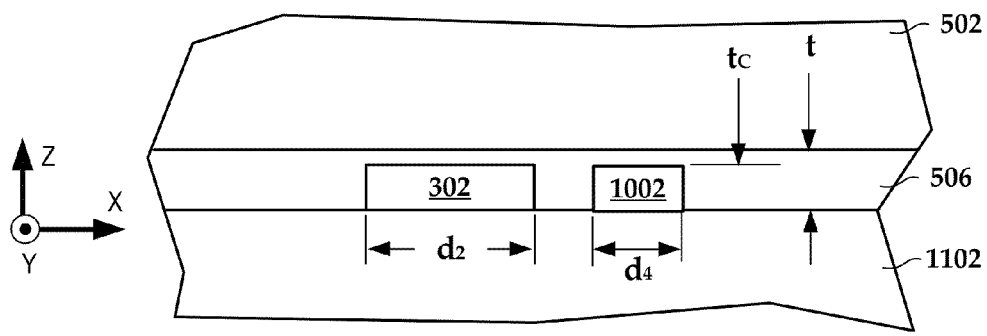
Figure 12:
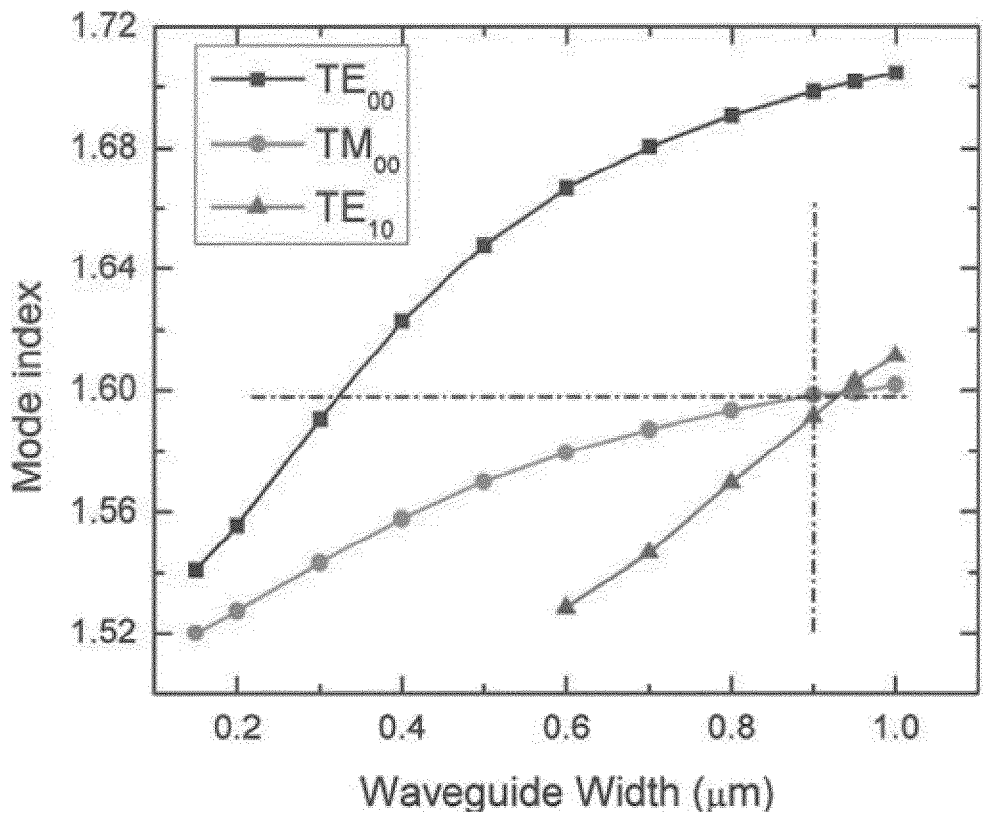
FIG. 12 is a graph showing mode indices of modes supported in output waveguide according to example embodiments.

In another example, a light path as shown in FIGS. 10 and 11 has a TiOx core with thickness $t_C$=120 nm thick, n=2.36. Another difference in this example is that, the top cladding 502 and side cladding 506 shown in FIGS. 10 and 11 are the same material, both formed from $SiO_2$. The input coupler tapers from 200 nm near the light source 102 to $W_1$=0.36 μm for efficient coupling from a laser diode. The dual-mode waveguide 302 has width=0.8 μm and $TE_{10}$ mode has effective mode index $n_{eff}(TE_{10})$=1.623.

For a conventional resonant directional coupler, the $TE_{00}$ mode in the input waveguide 1002 of width $W_3$=$W_4$=0.335 μm will match the $TE_{10}$ mode in output waveguide 302. For the coupled system separated by gap=150 nm, the mode indexes of the two normal modes are: $\beta_s$=1.65, $\beta_a$=1.60. The beat length for full $TE_{00}$-to-$TE_{10}$ mode transfer L=8.7 μm. For an adiabatic coupler, the length of region II is set to 18 μm. There is no tapering in region I: $W_2$=$W_3$=0.36 μm and the $TE_{00}$ mode in this region has a mode index $n_{eff}(TE_{00})$=1.643, which is greater than that of the $TE_{10}$ mode in output waveguide 302. This prevents the excitation of the asymmetric-like normal mode in the coupled system. The tapered velocity region II is optimized to maximize the $TE_{00}$-to-$TE_{10}$ mode transfer and is found to be $W_4$=0.29 μm wide with a transfer efficiency of 97%.

Figure 9:
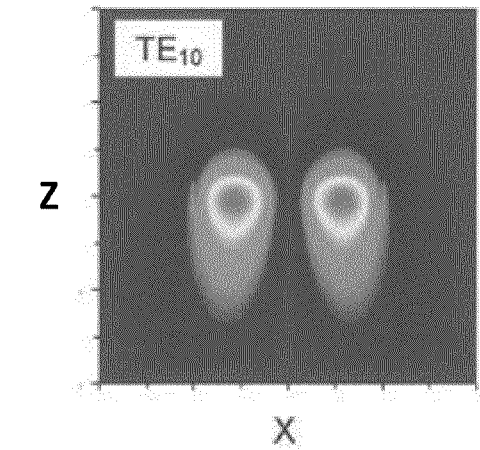
Figure 13:
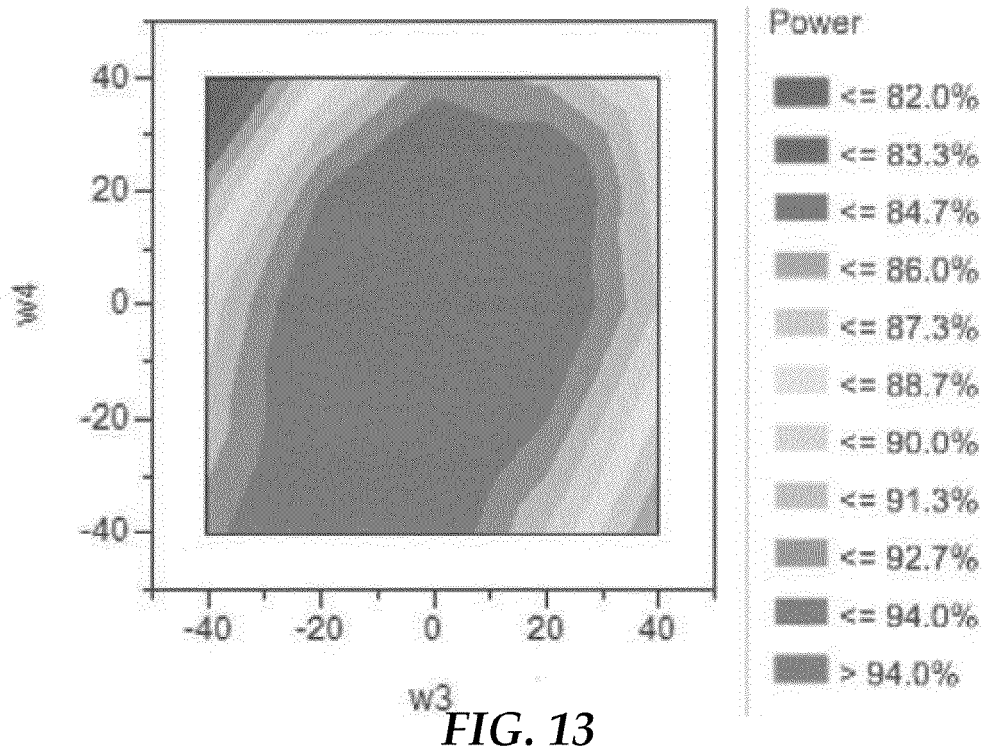
FIG. 13 is a plot showing mode transfer efficiency for various waveguide embodiments.
Figure 14:
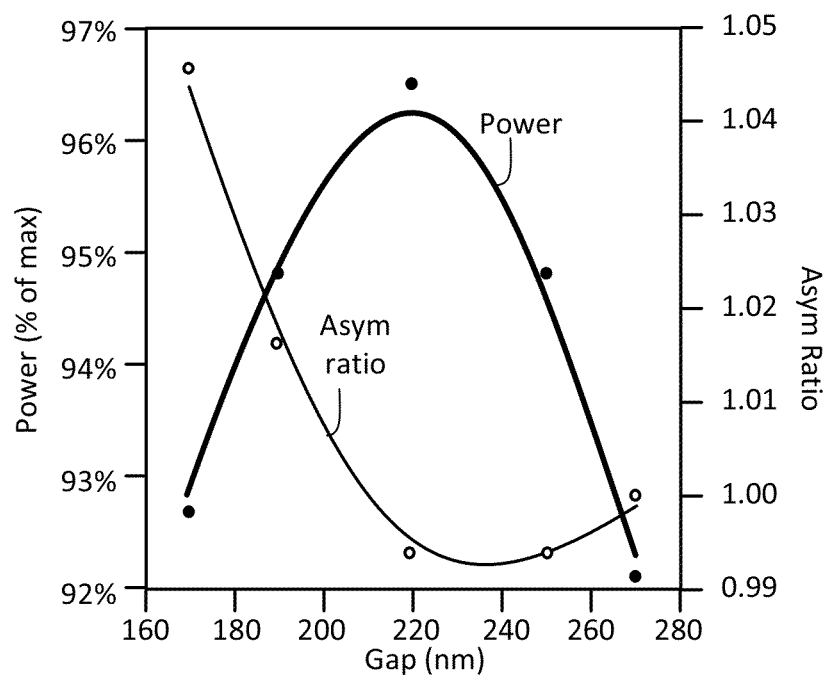
FIG. 14 is a plot showing asymmetry ratio and power versus waveguide separation for example waveguide embodiments.

The plot in FIG. 13 shows the mode transfer efficiency versus region II tapering ($W_3$–$W_4$) off from the optimal values. The plot in FIG. 14 shows changes in asymmetry ratio and power in the output waveguide versus waveguide separation for the first example. Asymmetry ratio is defined as the peak intensity ratio between the two spots in $TE_{10}$ mode, as seen in FIG. 9. Based on the plot in FIG. 13, it can be seen that there is wide fabrication tolerance for the tapering in region II. Similarly, the plot in FIG. 14 shows there is wide fabrication tolerance for the gap dimension.

Figure 15:
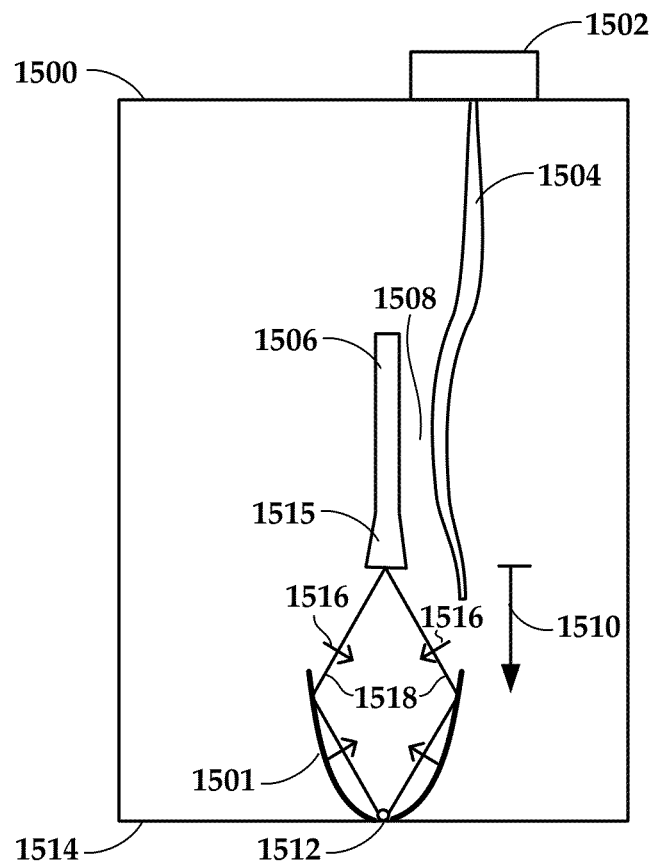
FIG. 15 is a block diagram showing a waveguide system according to another example embodiment.

Another configuration option in the light path is to use a solid immersion mirror (SIM) to condense the light exciting from a channel waveguide with $TE_{10}$ mode onto a near-field transducer. The block diagram in FIG. 15 shows a slider body 1500 with a SIM 1501 according to an example embodiment. A light source 1502 couples light into a three-dimensional, input waveguide 1504. The three-dimensional waveguide 1504 excites a higher-order TE mode in a dual-mode, channel output waveguide 1506 via a coupling region near gap 1508. The channel waveguide 1506 is coupled to a planar waveguide, which is in a region indicated by arrow 1510. Light of $TE_{10}$ mode profile exits from the channel waveguide 1506 and propagates through the planar waveguide 1510. It is focused by the SIM 1501 onto an optical near-field transducer 1512 proximate a media-facing surface 1514. A flared waveguide adapter 1515 couples the channel waveguide 1506 to the planar waveguide 1510, and is optimized for near-field transducer excitation efficiency. Arrows 1516 indicate polarization of light rays 1518 exiting the waveguide adapter 1515.

Figure 16:
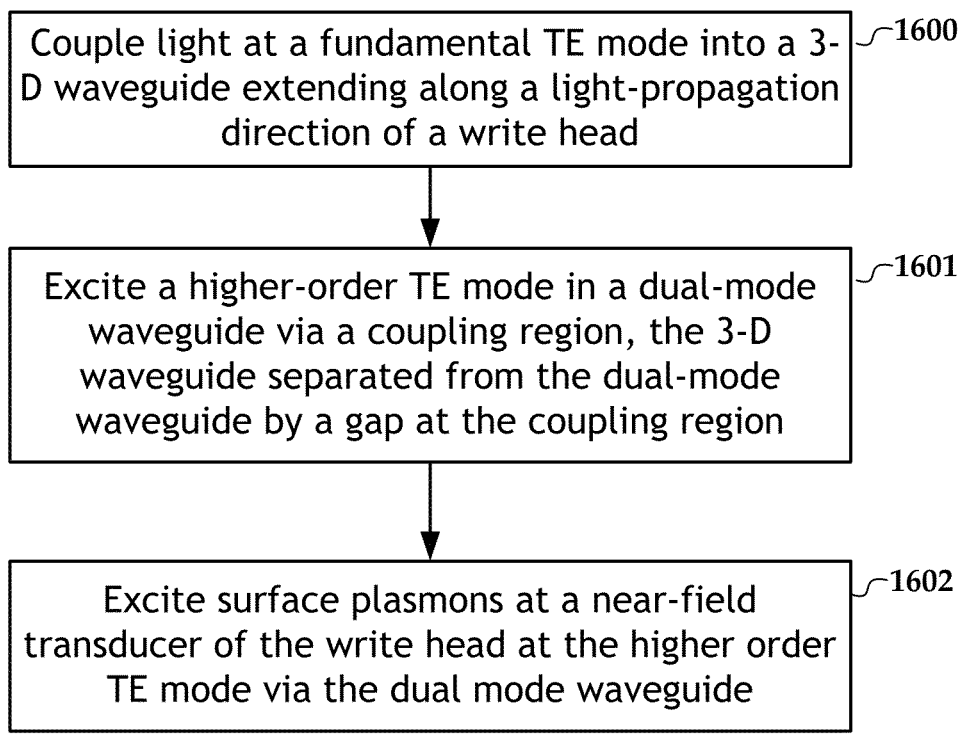
FIG. 16 is a flowchart illustrating a method according to an example embodiment.

In FIG. 16, a flowchart illustrates a method according to an example embodiment. The method involves coupling 1600 light at a fundamental transverse electric (TE) mode into a three-dimensional (3-D) waveguide extending along a light-propagation direction of a write head. The three-dimensional waveguide has an input coupler, a curved middle section, and a terminating end. In response to coupling 1600, a higher-order TE mode is excited 1601 in a dual-mode waveguide via a coupling region. The dual-mode waveguide extends along the light propagation direction and has an edge proximate to and separated from the curved section by a gap at the coupling region. Surface plasmons are excited 1602 at a near-field transducer at the higher-order TE mode via the dual-mode waveguide. The near-field transducer is at or near a media-facing surface of the write head. The surface plasmons may be used to heat a region of a recording medium. In such a case, an energizing current is applied to a write coil of the write head. The energizing current changing magnetic orientation of the region of the recording medium.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A write head comprising:
   a three-dimensional waveguide extending along a light-propagation direction and configured to receive light from a light source at a fundamental transverse electric (TE) mode, the three-dimensional waveguide comprising, in order along the light propagation direction, an input coupler, a curved middle section, and a terminating end, the input coupler being tapered between the light source and the curved middle section;
   a dual-mode waveguide extending along the light propagation direction and having an edge proximate to and separated from the curved section by a gap at a coupling region, the three-dimensional waveguide exciting a higher-order TE mode in the dual-mode waveguide via the coupling region; and
   a near-field transducer at a media-facing surface of the write head, the near-field transducer receiving the light at the higher-order TE mode from the dual-mode waveguide.

2. The write head of claim 1, wherein the curved middle section comprises a transition region that curves away from the dual-mode waveguide between the coupling region and the terminating end, the transition region mitigating excitation of the fundamental TE mode in the dual-mode waveguide.

3. The write head of claim 2, wherein the transition region tapers from a wider dimension towards the coupling region to a narrower dimension towards the terminating end.

4. The write head of claim 1, wherein the input coupler tapers from a narrower dimension proximate the light source to a wider dimension towards the curved middle section.

5. The write head of claim 1, where the curved middle section tapers from a wider dimension towards the input coupler to a narrower dimension towards the terminating end.

6. The write head of claim 1, further comprising an assistant layer between a core of the input coupler and a cladding layer that surrounds one side of the input coupler, the assistant layer comprising an index of refraction that is higher than that of the cladding layer and lower than that the core, the assistant layer matching a waveguide mode profile of the input coupler with the light source along a downtrack direction of the write head.

7. The write head of claim 6, wherein the assistant layer is truncated at an end of the input coupler proximate the curved middle section.

8. The write head of claim 1, wherein the three-dimensional waveguide and the dual-mode waveguide are co-planar.

9. The write head of claim 1, wherein the fundamental mode comprises a TE(0,0) mode and the higher-order mode comprises a TE(n, m) mode, wherein n>0 and m≥0.

10. The write head of claim 1, wherein the higher-order mode comprises a TE(1,0) mode.

11. The write head of claim 1, wherein a side cladding layer encompasses at least edges of the three-dimensional waveguide and the dual-mode waveguide.

12. The write head of claim 11, wherein the side cladding layer extends between sides of the three-dimensional waveguide and the dual-mode waveguide and a top cladding layer, a bottom cladding layer facing opposite sides of the three-dimensional waveguide and the dual-mode waveguide.

13. The write head of claim 12, wherein the side cladding layer comprises a same material as is used to form the bottom cladding layer.

14. The write head of claim 12, wherein the side cladding layer comprises a same material as is used to form the top cladding layer.

15. The write head of claim 1, further comprising a planar waveguide receiving the light from the dual-mode waveguide and a solid-immersion mirror focusing the light from the planar waveguide to the near-field transducer.

16. A method comprising:
   coupling light at a fundamental transverse electric (TE) mode into a three-dimensional waveguide extending along a light-propagation direction of a write head, the three-dimensional waveguide comprising an input coupler, a curved middle section, and a terminating end; and
   exciting a higher-order TE mode in a dual-mode waveguide via a coupling region in response to coupling the light at the fundamental TE mode into the three-dimensional waveguide, the dual-mode waveguide extending along the light propagation direction and having an edge proximate to and separated from the curved section by a gap at the coupling region; and
   exciting surface plasmons at a near-field transducer at a media-facing surface of the write head at the higher-order TE mode via the dual-mode waveguide.

17. The method of claim 16, further comprising matching a waveguide mode profile of the input coupler with the light source along a downtrack direction of the write head via an assistant layer, the assistant layer located between a core of the input coupler and a cladding layer that surrounds one side of the input coupler and comprising an index of refraction that is higher than that of the cladding layer and lower than that of the core.

18. The method of claim 16, wherein the surface plasmons heat a region of a recording medium, the method further comprising applying an energizing current to a write coil of the write head, the energizing current changing magnetic orientation of the region.

19. The method of claim 16, wherein exciting the higher-order TE mode in the dual-mode waveguide via the coupling region comprises adiabatic directional coupling of the dual-mode waveguide with the three-dimensional waveguide.

20. The method of claim 16, wherein exciting the higher-order TE mode in the dual-mode waveguide via the coupling region comprises resonant directional coupling of the dual-mode waveguide with the three-dimensional waveguide.

\* \* \* \* \*